US008044925B2

(12) United States Patent
Chen et al.

(10) Patent No.: US 8,044,925 B2
(45) Date of Patent: Oct. 25, 2011

(54) METHOD FOR DRIVING FIELD SEQUENTIAL LCD BACKLIGHT

(75) Inventors: Chien-Hung Chen, Hsin-Chu (TW); Mei-Sheng Ma, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 787 days.

(21) Appl. No.: 12/124,317

(22) Filed: May 21, 2008

(65) Prior Publication Data

US 2009/0122002 A1 May 14, 2009

(30) Foreign Application Priority Data

Nov. 12, 2007 (TW) ................................ 96142738 A

(51) Int. Cl.
*G02F 1/133* (2006.01)

(52) U.S. Cl. .............. 345/102; 345/87; 345/88; 345/89; 345/90; 345/91; 345/92; 345/93; 345/94; 345/95; 345/96; 345/97; 345/98; 345/99; 345/100; 345/101; 345/103; 345/104

(58) Field of Classification Search ............. 345/87–104
See application file for complete search history.

(56) References Cited

U.S. PATENT DOCUMENTS 6,570,554 B1 5/2003 Makino et al.
6,762,743 B2 7/2004 Yoshihara et al.
2004/0252097 A1* 12/2004 Kaneki et al. ................. 345/102
2007/0211013 A1* 9/2007 Uehara et al. ................. 345/102
2008/0055297 A1* 3/2008 Park ............................. 345/205
2009/0122001 A1* 5/2009 Cheung et al. ................ 345/102

FOREIGN PATENT DOCUMENTS

| | | |
|---|---|---|
| KR | 20030053829 | 7/2003 |
| KR | 1020040086942 | 10/2004 |
| KR | 1020050022702 | 3/2005 |
| KR | 1020070071737 | 7/2007 |
| WO | WO 2007/058448 | 5/2007 |

OTHER PUBLICATIONS

English language translation of abstract of KR 1020040086942 (published Oct. 13, 2004).
English language translation of abstract of KR 1020050022702 (published Mar. 8, 2005).
English language translation of abstract of KR 1020070071737 (published Jul. 4, 2007).
English language translation of abstract of KR 20030053829 (published Jul. 2, 2003).

* cited by examiner

*Primary Examiner* — Richard Hjerpe
*Assistant Examiner* — Jeffrey Steinberg
(74) *Attorney, Agent, or Firm* — Thomas, Kayden, Horstemeyer & Risley, LLP

(57) ABSTRACT

The present invention provides a method for driving a backlight module of a liquid crystal display. The backlight module includes three light sources, a first light source, a second light source, and a third light source, that illuminate different color light respectively. The method includes sequentially turning on the three light sources, wherein the first light source and the second light source are turned on twice and the third light source is turned on once.

8 Claims, 4 Drawing Sheets

METHOD FOR DRIVING FIELD SEQUENTIAL LCD BACKLIGHT

RELATED APPLICATIONS

This application claims priority to Taiwan Patent Application Serial Number 96142738, filed Nov. 12, 2007, which is herein incorporated by reference.

FIELD OF THE INVENTION

The present invention relates to an LCD driving method, and more particularly to a driving method for a field sequential LCD backlight.

BACKGROUND OF THE INVENTION

Generally, methods for driving an LCD can be classified into two methods, the color filter method and the field-sequential driving method, based on methods of displaying color images.

According to the color sequential method, three primary colors are sequentially switched within the time that humans percept the flicker of image to compose a color. That is, the primary colors are sequentially displayed in three time segments. Therefore, a complete color image is displayed as a rapidly changing sequence of primary monochrome images. Since every pixel unit in the display contributes to every primary image, a color sequential imaging display must address the pixel units first to select required pixel units to display. Since three primary colors are sequentially switched in three time segments in the color sequential method, a color difference exists between the moving object's head and tail, called color break-up; that may reduce the display quality. When a white color image moves from right side to left side, human eyes may catch up with this image. However, due to the vision persistence effect, a trailing image whose front end is red color and rear end is blue color is projected onto the retina.

FIG. 4 illustrates a white color image corresponding to m pixel to m+7 pixel. Since the display is driven by the color sequential method, corresponding to the horizontal axis, different colors of vertical axis are displayed in different times. Human's eyes trace the moving object and the trace leave on the retina for a while. At the beginning of the red-sub frame within the (N+1) frame, a white color image whose front end is red color and rear end is blue color is formed in retina Therefore, improving the image quality is one of the targets waiting for being solved.

SUMMARY OF THE INVENTION

One of the purposes of the present invention is to provide a color sequential method for a liquid crystal display to resolve the color breakup problem.

Accordingly, one aspect of the present invention provides a color sequential method for driving a backlight module of a liquid crystal display. The backlight module includes three light sources, a first light source, a second light source, and a third light source, and each illuminates different color light respectively. The method includes sequentially turning on the three light sources, wherein the first light source and the second light source are turned on twice and the third light source is turned on once.

DETAILED DESCRIPTION OF THE PREFERRED EMBODIMENT

Figure 1:
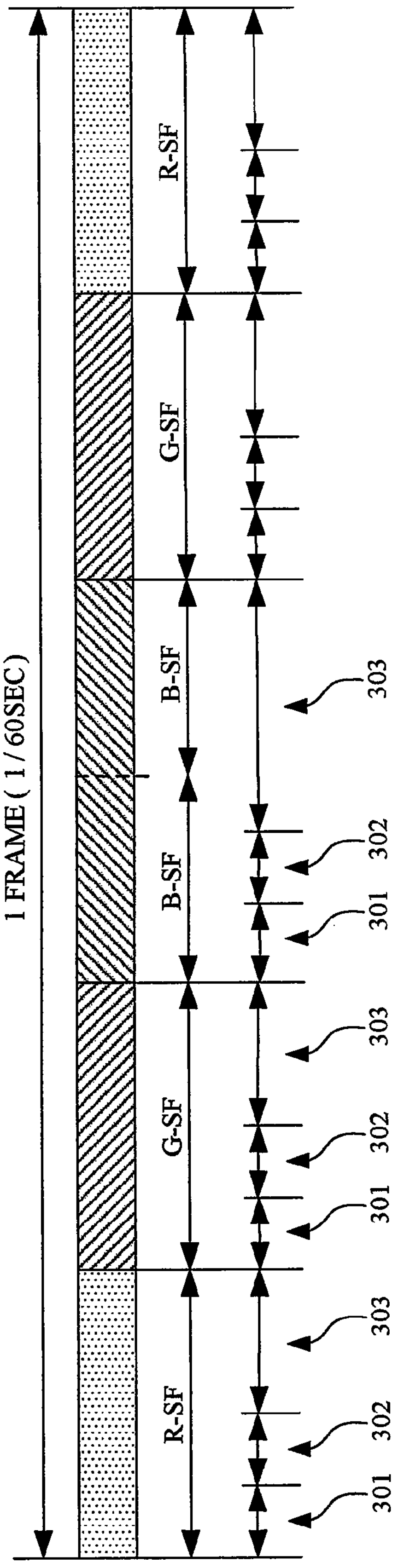
FIG. 1 illustrates a driving scheme of a field sequential LCD according to the preferred embodiment of the present invention.

The frequency of switching the red, green and blue color light source is increased to resolve the color breakup problem. Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a driving scheme for driving a backlight module of a field sequential LCD according to the preferred embodiment of the present invention. The backlight module includes three light sources, a red color light source, a green color light source and a blue color light source. In an embodiment, a frame is separated to six sub-frames, including two red sub-frames (R-SF), two green sub-frames (G-SF) and two blue sub-frames (B-SF) to sequentially show three primary colors, red color, green color and blue color, in the persistence of vision time. However, in this embodiment, a same color light source is turned on in the third sub-frame and the fourth sub-frame. Therefore, the third sub-frame and the fourth sub-frame are combined together to form a sub-frame. In other words, in this embodiment, the frame substantially includes five sub-frames. Any color can be created by mixing the three primary colors.

As shown in FIG. 1, each sub-frame has three intervals. The first interval is the addressing interval 301 for writing data into the sub-frame. The second interval is the waiting interval 302 for the response time of the liquid crystal. The third interval is the flashing interval 303 for turning on the light source. Therefore, the steps to display data in a frame include to write display data into the frame, to wait for the response of liquid crystal molecules based on the display data and to turn on a light source based on the display data.

According to this embodiment, the same color light source is turned on in the third sub-frame and the fourth sub-frame. For example, the blue color light source is turned on in the third sub-frame and the fourth sub-frame. However, in another embodiment, the other color light source can be turned on in the third sub-frame and the fourth sub-frame. Accordingly, since the blue color light source is turned on in the continuous third sub-frame and fourth sub-frame, only one addressing interval 301 and one waiting interval 302 are required. Moreover, since only one addressing interval 301 and one waiting interval 302 are required, the time period for keeping the blue color light source in turning on state could be less than twice the period for keeping the green color (or red color) light source in turning on state but larger than the period for keeping the green color (or red color) light source in turning on state.

Figure 2:
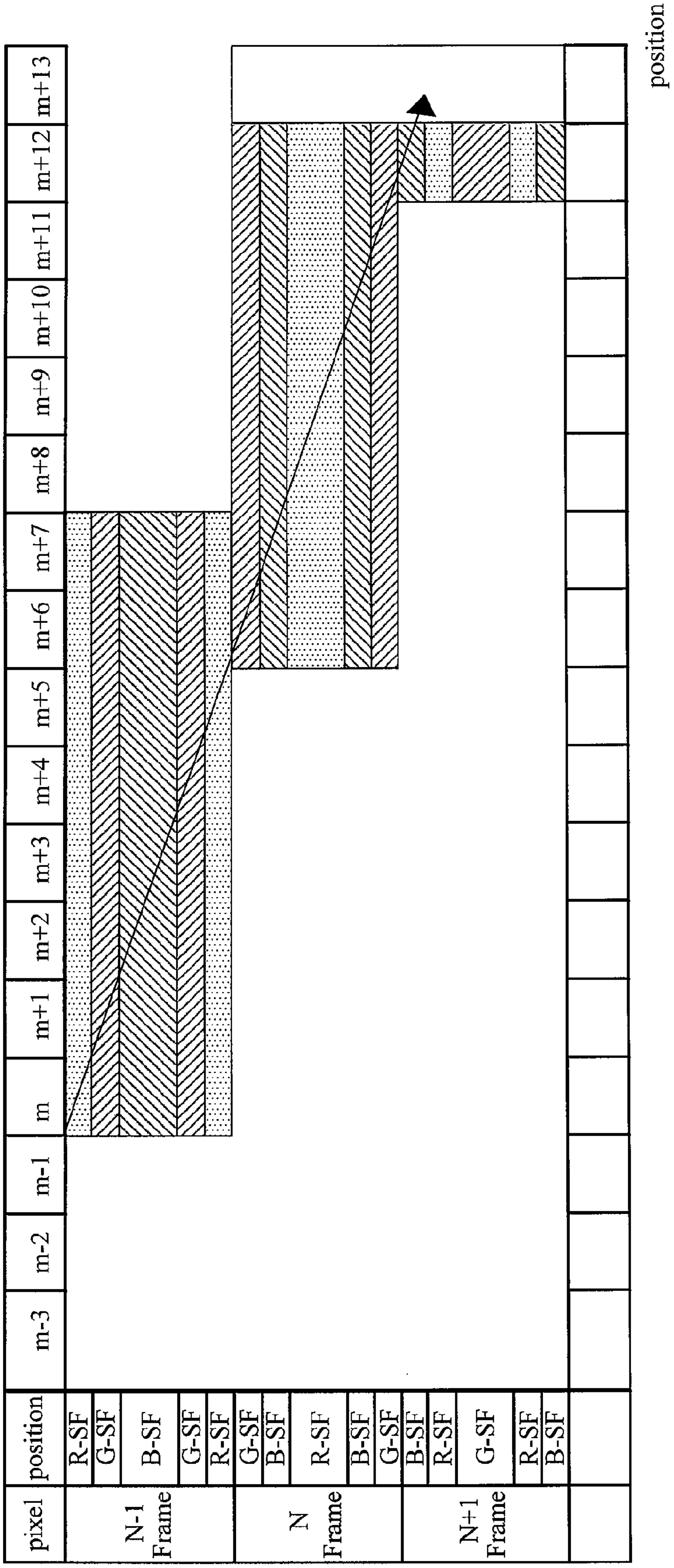
FIG. 2 illustrates a time chart of the backlight module related to a movement image in an LCD according to the preferred embodiment of the present invention.

FIG. 2 illustrates a time chart of the backlight module related to a movement image in an LCD according to the preferred embodiment of the present invention. The axis of ordinate is the time axis, and the axis of abscissa represents the position of pixel. In a case, a picture displayed on a liquid crystal panel is designed so that a white-color image corresponding to 8 pixels on the black background is allowed to shift six pixels for each frame in the increasing direction of the pixel numbers.

Accordingly, the order for displaying the display data in the position from m pixel to m+7 pixel within the n−1 frame is as follows. In the red sub-frame (R-SF), red display data is displayed. In the green sub-frame (G-SF), green display data is displayed. In the blue sub-frame (B-SF), blue display data is displayed. In the green sub-frame (G-SF), green display data is displayed. In the red sub-frame (R-SF), red display data is displayed.

Moreover, the order for displaying the display data in the position from m+6 pixel to m+13 pixel within the n frame is as follows. In the green sub-frame (G-SF), green display data is displayed. In the blue sub-frame (B-SF), blue display data is displayed. In the red sub-frame (R-SF), red display data is displayed. In the blue sub-frame (B-SF), blue display data is displayed. In the green sub-frame (G-SF), green display data is displayed. By sequentially showing the three primary colors, red color, green color and blue color, in the persistence of vision time, color display may be reached.

When such an image is observed, the observer views the image while shifting his or her view point following the shift of the image. Therefore, the observer has to shift his or her view point six pixels for each frame in the shifting direction of the image, as illustrated in the FIG. 3. The axis of ordinate is the time axis, and the axis of abscissa represents the position of pixel. Within the n−1 frame, the red display data corresponding to pixel m to pixel m+7 is displayed in the red sub-frame. Since the view point is being shifted following the shift of the image, the red display data thus displayed is observed as if it were flowing in a direction opposite to the shifting direction of the view point (in a decreasing direction of the pixel numbers). In the green sub-frame, since the view point has been further shifted, the green display data is observed as if it were further flowing in the decreasing direction of the pixel numbers as compared with the red display data. In the same manner, the blue display data is observed as if it were further flowing in the decreasing direction of the pixel numbers as compared with the green display data.

Figure 3:
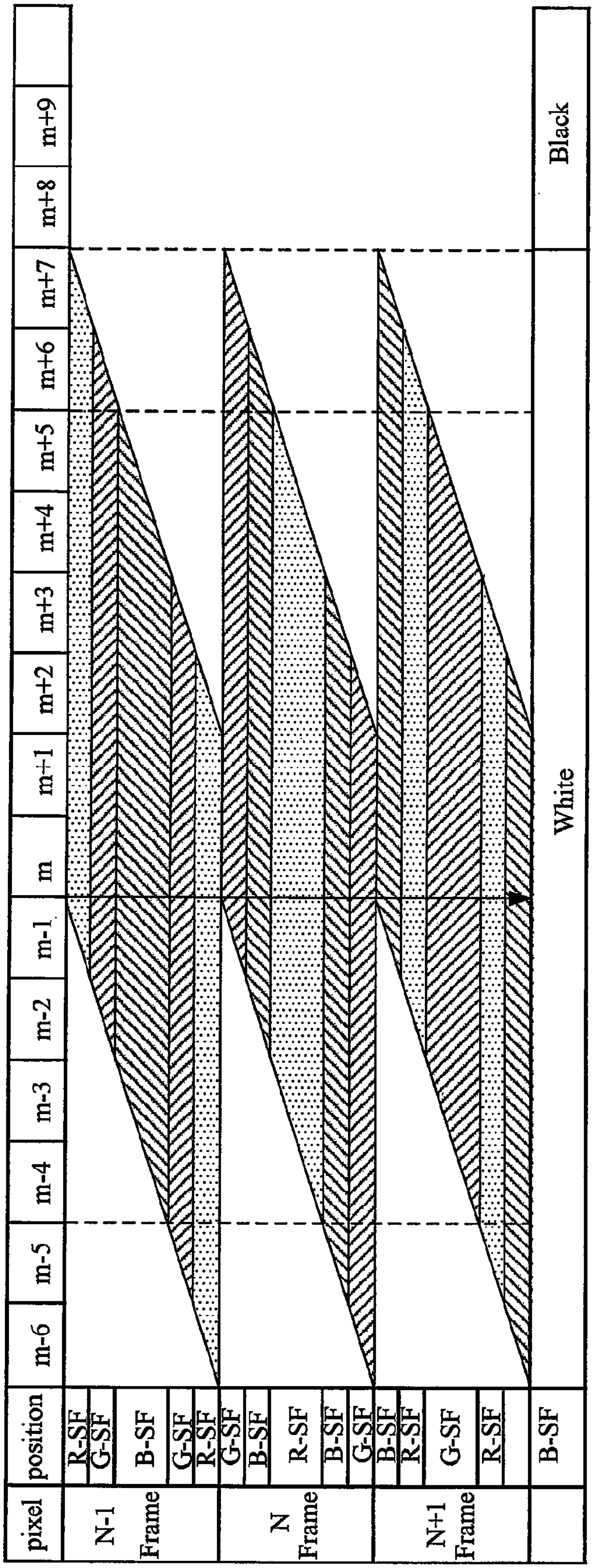
FIG. 3 illustrates a time chart recognized by an observer related to a movement image in an LCD according to the preferred embodiment of the present invention.
Figure 4:
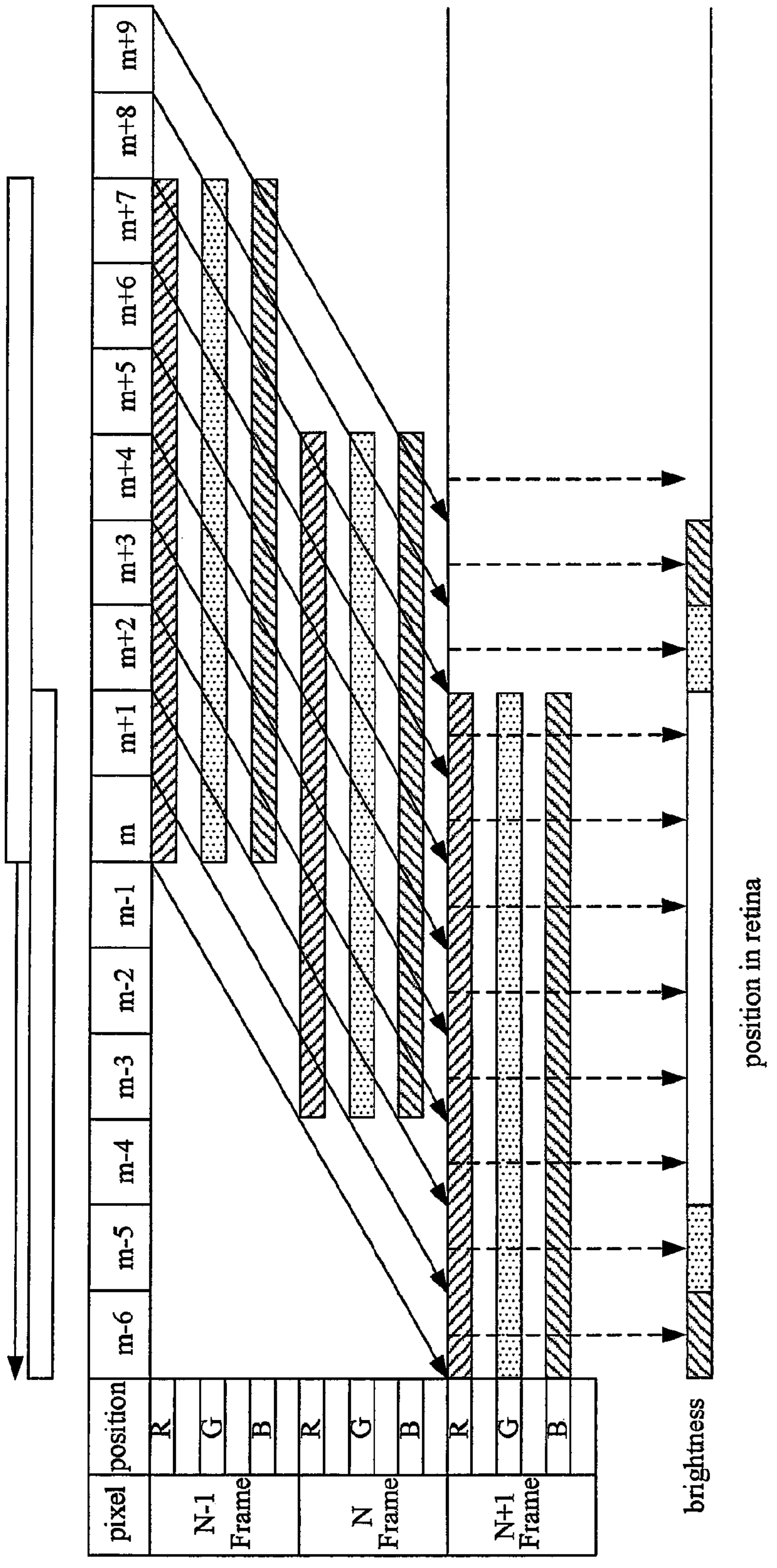
Fig. 4 (Prior Art)
FIG. 4 illustrates a white color image corresponding to m pixel to m+7 pixel.

In this embodiment, each frame includes five sub-frames. Therefore, in a frame, the red light source and the green light source are turned on twice and the blue light source is turned on once. However, in another embodiment, the light source that is turned on once also can select the red light or green light. By sequentially showing three primary colors in the persistence of vision time, any color can be created by mixing the three primary colors. Since the frequency to sequentially turn on the light source is raised, three primary colors may appear two times within a frame. In other words, the three primary colors are overlapped in the (m−6) to (m+7) pixels. Therefore, as illustrated in FIG. 3, in these pixels, color display can be reached.

Moreover, in this embodiment, same color light source is turned on in the continuous third sub-frame and fourth sub-frame. Therefore, the third sub-frame and fourth sub-frame are combined together to be as a sub-frame. That is that only one addressing interval and one waiting interval are required. Compared with the conventional double frame rate requiring six sub-frames, only five sub-frames are required in the present invention to reach the double frame rate effect. Therefore, each sub-frame occupies a longer time period in a frame. The increased time period is used as the waiting interval for the response time of the liquid crystal. On the other hand, the frame rate is higher than 60 Hz, which can improve the color breakup phenomenon.

While the foregoing is directed to embodiments of the present invention, other and further embodiments of the invention may be devised without departing from the basic scope thereof, and the scope thereof is determined by the claims that follow.

What is claimed is:

1. A method for driving a backlight module of a liquid crystal display, wherein the backlight module includes a first light source, a second light source, and a third light source, each light source respectively illuminating different color light, the method comprising:
- turning on the three light sources sequentially, wherein the first light source and the second light source are turned on twice and the third light source is turned on once in a frame;
- wherein turning on the three light sources sequentially includes:
  - turning on the first light source;
  - turning on the second light source;
  - turning on the third light source;
  - turning on the second light source; and
  - turning on the first light source, wherein the period for keeping the third light source in turning on state is shorter than twice the period for keeping the first light source in turning on state but longer than the period for keeping the first light source in turning on state.

2. The method of claim 1, wherein the period for keeping the third light source in turning on state is shorter than twice the period for keeping the second light source in turning on state but longer than the period for keeping the second light source in turning on state.

3. The method of claim 1, wherein turning on the three light sources sequentially includes:
- writing display data into the frame;
- waiting for the response of liquid crystal molecules based on the display data; and
- turning on a light source based on the display data.

4. The method of claim 1, wherein the first light source is a red color light source, the second light source is a green color light source, and the third light source is a blue color light source.

5. A method for driving a backlight module of a liquid crystal display, wherein the backlight module includes a first light source, a second light source, and a third light source, each light source respectively illuminating different color light, the method comprising:
- turning on the three light sources sequentially, wherein the first light source and the second light source are turned on twice and the third light source is turned on once in a frame, wherein the time period for keeping the third light source in turning on state is less than twice the time period for keeping the first or second light source in turning on state but larger than the time period for keeping the first or second light source in turning on state.

6. The method of claim 5, wherein turning on the three light sources sequentially includes:
- turning on the first light source;
- turning on the second light source;
- turning on the third light source;
- turning on the second light source; and
- turning on the first light source.

7. The method of claim 6, wherein turning on the three light sources sequentially includes:
- writing display data into the frame;
- waiting for the response of liquid crystal molecules based on the display data; and
- turning on a light source based on the display data.

8. The method of claim 5, wherein the first light source is a red color light source, the second light source is a green color light source, and the third light source is a blue color light source.

* * * * *